US011750664B2

(12) United States Patent
Shook (10) Patent No.: US 11,750,664 B2
(45) Date of Patent: Sep. 5, 2023

(54) SYSTEM FOR CONTENT TRIGGERED HIGH-SPEED DATA SERVICE DELIVERY INDEPENDENT OF MEDIA DELIVERY MECHANISMS

(71) Applicant: Buckeye Cablevision, Inc., Northwood, OH (US)

(72) Inventor: Geoffrey A. Shook, Sylvania, OH (US)

(73) Assignee: Buckeye Cablevision, Inc., Northwood, OH (US)

( * ) Notice: Subject to any disclaimer, the term of this patent is extended or adjusted under 35 U.S.C. 154(b) by 0 days.

(21) Appl. No.: 17/874,456

(22) Filed: Jul. 27, 2022

(65) Prior Publication Data

US 2022/0360610 A1  Nov. 10, 2022

Related U.S. Application Data

(63) Continuation of application No. 16/919,448, filed on Jul. 2, 2020, now Pat. No. 11,425,174.

(60) Provisional application No. 62/870,206, filed on Jul. 3, 2019.

(51) Int. Cl.
*H04L 65/1023* (2022.01)
*H04N 21/482* (2011.01)
*H04N 21/643* (2011.01)
*H04L 65/611* (2022.01)

(52) U.S. Cl.
CPC ........ *H04L 65/1023* (2013.01); *H04L 65/611* (2022.05); *H04N 21/482* (2013.01); *H04N 21/64322* (2013.01)

(58) Field of Classification Search
CPC ............. H04L 65/1023; H04L 65/4076; H04L 65/4084; H04N 21/482; H04N 21/64322; H04N 21/2543; H04N 21/6338
See application file for complete search history.

(56) References Cited

U.S. PATENT DOCUMENTS

| | | | |
|---|---|---|---|
| 6,947,531 B1 * | 9/2005 | Lewis | G06Q 30/0207 |
| | | | 705/14.1 |
| 8,997,138 B2 * | 3/2015 | Shkedi | H04N 21/812 |
| | | | 725/35 |
| 9,131,282 B2 * | 9/2015 | Shkedi | H04N 21/4622 |
| 9,516,164 B1 * | 12/2016 | Keiser | H04M 3/42348 |
| 9,530,150 B2 * | 12/2016 | Goldberg | G06Q 30/0273 |

(Continued)

OTHER PUBLICATIONS

Canada Patent Office; Examination Report dated Oct. 14, 2021 which was cited in Canadian Application No. 3,085,605; 4 pages.

*Primary Examiner* — Fernando Alcon
(74) *Attorney, Agent, or Firm* — Shumaker, Loop & Kendrick, LLP; Patrick B. Horne (57) ABSTRACT

Embodiments of the present invention disclose a system for content triggered high-speed data service delivery independent of media delivery mechanisms. A backend system receives instructions from high-speed data customer indicating a selection of content triggered data service delivery; in response to receiving the instructions, enables content triggered data service delivery; (i) causes a gateway to cut-off HSD service or (ii) cuts-off supply to the gateway; causes a specified device connected to the gateway on its customer side to run a triggering content; and, in response to completion of running of the triggering content on the specified device, (i) causes the gateway to cut-on HSD service for the customer, or (ii) cutting on HSD service to the gateway and customer.

21 Claims, 12 Drawing Sheets

(56) References Cited

U.S. PATENT DOCUMENTS

| | | | |
|---|---|---|---|
| 2002/0007313 A1* | 1/2002 | Mai | G06Q 30/0218 705/26.1 |
| 2002/0082913 A1* | 6/2002 | Li | G06Q 30/02 705/14.61 |
| 2007/0088801 A1* | 4/2007 | Levkovitz | H04L 12/1859 709/217 |
| 2007/0274483 A1* | 11/2007 | Shapiro | H04M 15/00 379/114.12 |
| 2010/0188994 A1* | 7/2010 | Raleigh | G06Q 40/12 370/252 |
| 2010/0211446 A1* | 8/2010 | Ray | G06Q 30/0264 705/14.1 |
| 2011/0275346 A1* | 11/2011 | Fraser | H04M 3/4878 455/408 |
| 2012/0265604 A1* | 10/2012 | Corner | H04W 4/21 705/14.39 |
| 2014/0220927 A1* | 8/2014 | Girard | H04L 12/1475 455/405 |
| 2015/0213504 A1* | 7/2015 | Katz | G06Q 30/0267 705/14.64 |
| 2017/0206529 A1* | 7/2017 | Raleigh | G06Q 40/03 |
| 2021/0006534 A1* | 1/2021 | Weber | H04L 61/5014 |
| 2021/0006635 A1* | 1/2021 | Weber | H04L 12/66 |
| 2022/0201369 A1* | 6/2022 | McClendon | G06F 3/04817 |
| 2022/0272205 A1* | 8/2022 | Flynn | G06Q 30/0241 |
| 2023/0040365 A1* | 2/2023 | Raleigh | H04M 15/81 |

* cited by examiner

Multi-product customer with HSD goes into non-pay, then CTS, and then collections.

Note: if HSD customer has a static IP address, they will lose the static IP address when they downgrade to CTS.

Single pay customer with HSD goes into non-pay, then CTS, and then collections.

Note: if HSD customer has a static IP address, they will lose the static IP address when they downgrade to CTS.

FIG. 3F

Single pay customer with HSD goes into non-pay, then CTS, and then pays off balance.

New customer contacts BB for CTS service.

New CTS customers will be treated like subscription customers during account/service set up.

SYSTEM FOR CONTENT TRIGGERED HIGH-SPEED DATA SERVICE DELIVERY INDEPENDENT OF MEDIA DELIVERY MECHANISMS

This application claims priority to co-pending U.S. Non-Provisional application Ser. No. 16/919,448, filed Jul. 2, 2020, entitled "SYSTEM FOR CONTENT TRIGGERED HIGH-SPEED DATA SERVICE DELIVERY INDEPENDENT OF MEDIA DELIVERY MECHANISMS" and U.S. Provisional Application No. 62/870,206, filed Jul. 3, 2019, entitled "SYSTEM FOR CONTENT TRIGGERED HIGH-SPEED DATA SERVICE DELIVERY INDEPENDENT OF MEDIA DELIVERY MECHANISMS," which are hereby incorporated herein in their entireties.

FIELD

This invention relates generally to the field of Internet service provisioning, and more particularly embodiments of the invention relate to a system for content supported high-speed data service delivery independent of media delivery mechanisms.

BACKGROUND

Internet service providers, cable companies, and other telecommunications organizations create infrastructure to provide high speed data connections for end users—both businesses and residential customers. In some situations, access to such a service is expensive and can represent a significant expense to a family. Accordingly, what is needed is a system for providing high-speed data service delivery independent of media delivery mechanisms.

BRIEF SUMMARY

Embodiments of the present invention address the above needs and/or achieve other advantages by providing apparatuses (e.g., a system, computer program product, and/or other devices) and methods that provide high-speed data service delivery independent of media delivery mechanisms in response to a user's viewing of content or performing some other triggering action.

Embodiments of the present invention disclose systems and methods for content triggered high-speed data service delivery independent of media delivery mechanisms.

According to some embodiments, a backend system has a memory device; and a processing device operatively coupled to the memory device, where the processing device is configured to execute computer-readable program code to receive instructions from high-speed data customer indicating a selection of content triggered data service delivery; in response to receiving the instructions, enable content triggered data service delivery; cause a gateway to cut-off HSD service; cause a specified device connected to the gateway on its customer side to run a triggering content; and, in response to completion of running of the triggering content on the specified device, causing the gateway to cut-on HSD service for the customer.

In some embodiments, the received instructions are transmitted from a device on a customer side of the gateway, through the gateway, to the backend system. In some such embodiments, the specified device is the device from which the received instructions were transmitted.

In some embodiments, the specified device is predetermined based on at least selected from a most-used device, a least-used device, a latest-used device, and a next-used device.

In some embodiments, cutting off HSD service by the gateway comprises preventing HSD service for all devices connected to a customer side of the gateway.

In some embodiments, cutting off HSD service by the gateway comprises preventing HSD service for less than all devices connected to a customer side of the gateway.

In some embodiments each of the causing elements comprises transmitting instructions from the backend system.

According to embodiments of the invention, a backend system includes a memory device; and a processing device operatively coupled to the memory device, wherein the processing device is configured to execute computer-readable program code to receive instructions from high-speed data customer indicating a selection of content triggered data service delivery; in response to receiving the instructions, enable content triggered data service delivery; cut-off supply to the gateway; cause a specified device connected to the gateway on its customer side to run a triggering content; and, in response to completion of running of the triggering content on the specified device, cutting on supply to the gateway.

In some embodiments, the received instructions are transmitted from a device on a customer side of the gateway, through the gateway, to the backend system. In some such embodiments, the specified device is the device from which the received instructions were transmitted.

In some embodiments, the specified device is predetermined based on at least selected from a most-used device, a least-used device, a latest-used device, and a next-used device.

In some embodiments, cutting off HSD service by the gateway comprises preventing HSD service for all devices connected to a customer side of the gateway.

In some embodiments, cutting off HSD service by the gateway comprises preventing HSD service for less than all devices connected to a customer side of the gateway.

In some embodiments, each of the causing elements comprises transmitting instructions from the backend system.

According to embodiments of the invention, a system has a backend system comprising a memory device; and a processing device operatively coupled to the memory device, wherein the processing device is configured to execute computer-readable program code to receive instructions from high-speed data customer indicating a selection of content triggered data service delivery; in response to receiving the instructions, enable content triggered data service delivery; cause a gateway system to cut-off HSD service; cause a specified device connected to the gateway on its customer side, through the gateway system, to run a triggering content; and, in response to completion of running of the triggering content on the specified device, causing the gateway to cut-on HSD service for the customer; and a gateway system in operative communication with the backend system, the gateway system having a memory device; and a processing device operatively coupled to the memory device, wherein the processing device is configured to execute computer-readable program code to, in response to receiving instructions from the backend system, cut-off HSD service and cut-on HSD service.

In some embodiments, the specified device is the device from which the received instructions were transmitted.

In some embodiments, the specified device is predetermined based on at least selected from a most-used device, a least-used device, a latest-used device, and a next-used device.

In some embodiments, cutting off HSD service by the gateway comprises preventing HSD service for all devices connected to a customer side of the gateway.

In some embodiments, cutting off HSD service by the gateway comprises preventing HSD service for less than all devices connected to a customer side of the gateway.

According to embodiments of the invention, a method includes receiving instructions from high-speed data customer indicating a selection of content triggered data service delivery; in response to receiving the instructions, enabling content triggered data service delivery; causing a gateway to cut-off HSD service; causing a specified device connected to the gateway on its customer side to run a triggering content; and, in response to completion of running of the triggering content on the specified device, causing the gateway to cut-on HSD service for the customer.

According to embodiments of the invention, a method includes receiving instructions from high-speed data customer indicating a selection of content triggered data service delivery; in response to receiving the instructions, enabling content triggered data service delivery; cutting off supply to the gateway; causing a specified device connected to the gateway on its customer side to run a triggering content; and, in response to completion of running of the triggering content on the specified device, cutting on supply to the gateway.

The features, functions, and advantages that have been discussed may be achieved independently in various embodiments of the present invention or may be combined in yet other embodiments, further details of which can be seen with reference to the following description and drawings.

BRIEF DESCRIPTION OF THE SEVERAL VIEWS OF THE DRAWINGS

Having thus described embodiments of the invention in general terms, reference will now be made to the accompanying drawings, wherein:

FIGS. 3A-3J are flowcharts illustrating methods according to embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Previous content (e.g., advertisement) delivery systems exist for specific types of applications (HULU, YouTube, FaceBook, Boingo, etc.). The systems represented by embodiments of the present invention are non-specific and will re-direct Internet and high speed data traffic without regard to application or device. The re-direction function is triggered through configurable parameters within this platform. The platform consists of a combination of proprietary software written for this application that controls all aspects of the management of customer/subscriber data traffic in a closed service provider data network.

WIFI captive proxy systems used by Boingo, RaGaPa, and ALEPO use a subset of this method, but do so for public paid subscription Internet access for wireless 802.11 network access only. These systems allow only one path from the subscriber to the Internet through a proxy server. This system leverages the aforementioned playback system only (similar to a Blu-ray player) and manipulates data network IP router traffic to connect and disconnect the customer/subscriber from the playback system for the purpose of viewing advertisements.

The present invention relates to an integration of previously existing, and some newly created subsystems that facilitate the delivery of a non-fee based, content (e.g., advertisement) supported high speed Internet service product. The system is capable of being integrated with a service operator's existing billing system platform to provision, maintain and support a customer/subscriber's Internet access. The system is designed to provide this service independent of the technical delivery mechanism, and currently provides service over wired (copper and coaxial cable), fiber optic and wireless delivery systems.

This invention can be used with any existing high speed data network and Internet access system, without regard to delivery mechanism, and without the need to alter infrastructure through the use of proxy servers. It can be used and controlled by any billing system platform as well through the use of Application Program Interfaces (APIs).

The immediate use of the invention will be to provide ubiquitous Internet access for those customers/Subscribers who cannot afford a standard monthly fee. The system will be supported by funding gained through the dissemination of paid advertising revenue. This will open access to 100% of connected households within the existing service provider area. This ostensibly provides "free" Internet service for those who cannot otherwise afford it.

Accordingly, embodiments of the present invention disclose a system for content triggered high-speed data service delivery independent of media delivery mechanisms. The system and/or service described herein may be referred to as the content triggered system or service (CTS). A backend system receives instructions from high-speed data customer indicating a selection of content triggered data service delivery; in response to receiving the instructions, enables content triggered data service delivery; (i) causes a gateway to cut-off HSD service or (ii) cuts-off supply to the gateway; causes a specified device connected to the gateway on its customer side to run a triggering content; and, in response to completion of running of the triggering content on the specified device, (i) causes the gateway to cut-on HSD service for the customer, or (ii) cutting on HSD service to the gateway and customer.

Figure 1:
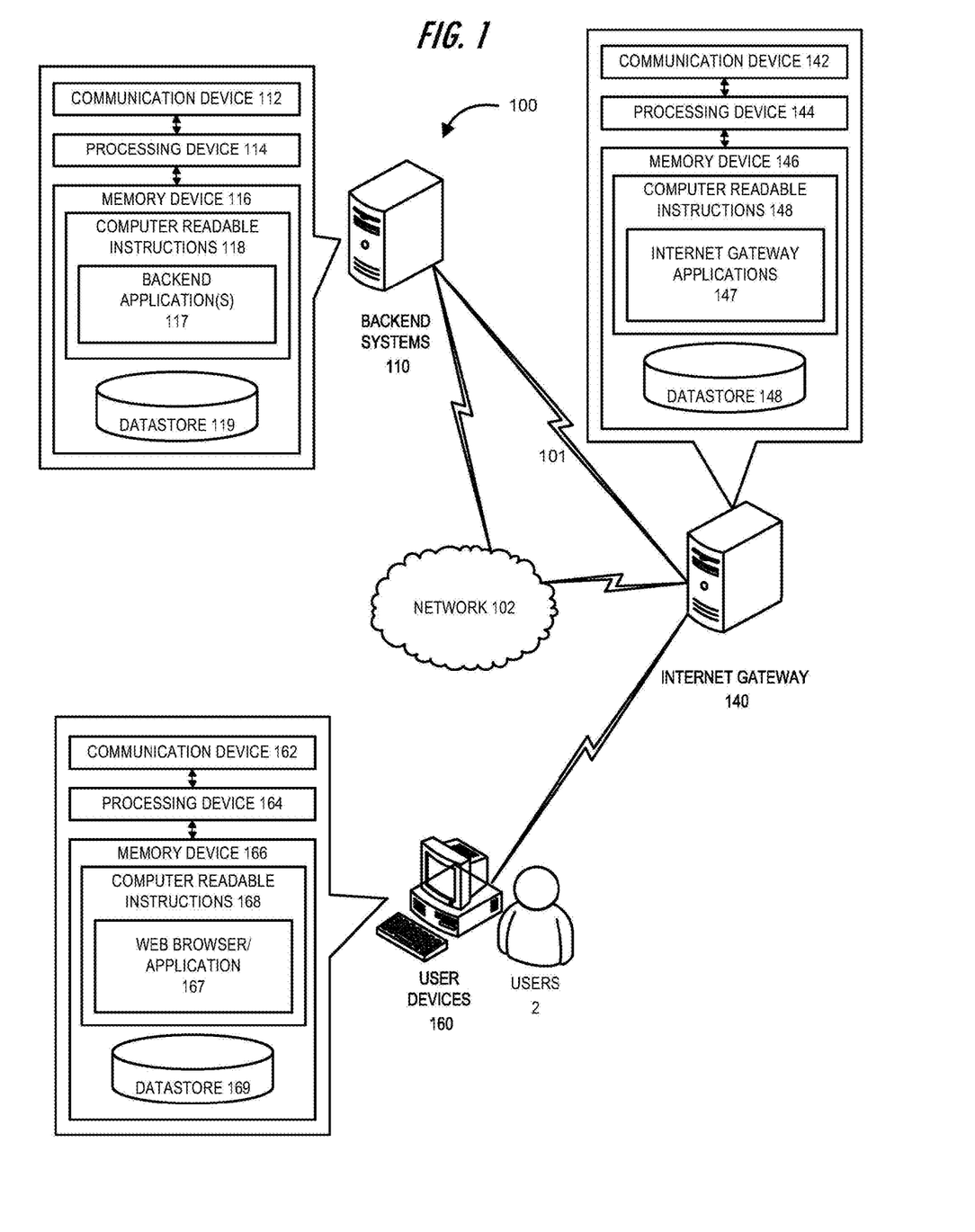
FIG. 1 illustrates an environment in which systems operate according to embodiments of the invention.

Referring now to FIG. 1, a data service environment 100 in which systems operate according to embodiments of the invention. The data service environment 100, in accordance with an embodiment of the present invention. As illustrated in the data service environment 100 of FIG. 1, the user devices 160 are operatively coupled, via an Internet gateway 140, and either (i) through the network 102 or directly (or indirectly) through connection 101 to the backend systems 110, and/or other systems of an entity, such as an Internet service provider (ISP). The ISP provides data services for end users in such a configuration through the Internet gateway 140. In this way, the user 2 may utilize the user devices 160 to access the Internet through the Internet gateway 140. FIG. 1 illustrates only one example of embodiments of a data service environment 100, and it will be appreciated that in other embodiments one or more of the systems (e.g., computers, mobile devices, servers, or other like systems) may be combined into a single system or be made up of multiple systems.

The network 102 may be a global area network (GAN), such as the Internet, a wide area network (WAN), a local area network (LAN), or any other type of network or combination of networks. The network 102 may provide for wireline, wireless, or a combination of wireline and wireless communication between devices on the network.

As illustrated in FIG. 1, the user devices 160 may include a communication device 162, a processing device 164, and a memory device 166. As used herein, the term "processing device" generally includes circuitry used for implementing the communication and/or logic functions of a particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The network 102 may be a global area network (GAN), such as the Internet, a wide area network (WAN), a local area network (LAN), or any other type of network or combination of networks. The network 102 may provide for wireline, wireless, or a combination of wireline and wireless communication between devices on the network.

As illustrated in FIG. 1, the user devices 160 may include a communication device 162, a processing device 164, and a memory device 166. As used herein, the term "processing device" generally includes circuitry used for implementing the communication and/or logic functions of a particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 164 is operatively coupled to the communication device 162 and the memory device 166. The processing device 164 uses the communication device 162 to communicate, via the Internet gateway 140 with the network 102 and other devices on the network 102, such as, but not limited to, the backend systems 110 and/or other devices, servers, systems or the like. As such, the communication device 162 generally comprises a modem, server, WiFi capabilities, Bluetooth capabilities, or other device for communicating with the Internet gateway 140, and a display, camera, keypad, touchpad, mouse, keyboard, microphone, and/or speakers for communicating with one or more users 102. The user devices 160 may be or include, for example, a personal computer, a laptop, a mobile device (e.g., phone, smartphone, tablet, or the like), Internet of things (IOT) devices, connected devices, smart home devices, or other like devices whether or not the devices are mentioned within this specification. In some embodiments, the user devices 160 could include a data capture device that is operatively coupled to the communication device 162, processing device 164, and the memory device 166. The data capture device could include devices such as, but not limited to a location determining device, such as a radio frequency identification ("RFID") device, a global positioning satellite ("GPS") device, Wi-Fi triangulation device, or the like, which can be used by a user 2, institution, or the like to capture information from a user 2, such as but not limited to the location of the user 2.

As further illustrated in FIG. 1, the user devices 160 include computer-readable instructions 168 stored in the memory device 166, which in one embodiment includes the computer-readable instructions 168 of a web browser/application 167. In some embodiments, the memory device 166 includes a datastore 169 for storing data related to the user devices 160, including but not limited to data created and/or used by the web browser/application 167. As discussed above the web browser/application 167 allows the users 2 to interact over the Internet through the Internet gateway 140.

As further illustrated in FIG. 1, the backend systems 110 generally include a communication device 112, a processing device 114, and a memory device 116. The processing device 114 is operatively coupled to the communication device 112 and the memory device 116. The processing device 114 uses the communication device 112 to communicate with the network 102, and other devices on the network 102, such as, but not limited to, the user devices 160 through the Internet gateway 140. As such, the communication device 112 generally comprises a modem, server, WiFi capabilities, Bluetooth capabilities or other device(s) for communicating with other systems on the network 102 (i.e., the Internet).

As illustrated in FIG. 1, the backend systems 110 also may include computer-readable program instructions 118 stored in the memory device 116, which in one embodiment includes the computer-readable instructions 118 of a backend application 117. In some embodiments, the memory device 116 includes a datastore 119 for storing data related to the backend systems 110, including but not limited to data created and/or used by the backend application 117.

The backend system 110 may be or include one or more billing systems, re-direct systems, triggering content (i.e., advertisement) playback systems, and/or the like. Thus, the backend application(s) 117 may be or include one or more billing applications that processes transactions with the user, a device connected to the Internet gateway 140 or otherwise, one or more re-direction applications that re-direct a user's and/or device's interactions over the Internet gateway 140 and/or the network 102, one or more triggering content playback TCP applications, or the like. The TCP application may, in some embodiments, transmit a content file or content packet with instructions to playback the content file. Such a transmission may be sent from the backend system 110 through the Internet gateway 140 to one or more specified user devices 160 for viewing by a user 2. In another embodiment, the TCP application opens a content file or packet, plays the content, and streams the content through the Internet gateway 140 to one or more specified devices 160 for viewing by a user 2. In another embodiment, the TCP application sends content files to the Internet gateway 140 and/or the user devices 160, and in some cases, sends instructions to playback the files immediately or upon occurrence of one or more triggering events.

As further illustrated in FIG. 1, the Internet gateway 140 may include a communication device 142, a processing device 144, and a memory device 146. The processing device 144 is operatively coupled to the communication device 142 and the memory device 146. The processing device 144 uses the communication device 142 to communicate with the network 102, and other devices on the network 102, such as, but not limited to, the backend systems 110, and provides a gateway between the user devices 160 and the network 102. As such, the communication device 142 generally comprises a modem, server, or other devices for communicating with the network 102 and/or backend systems 110. In some embodiments, the Internet gateway is coupled with a cable modem or other device that is connected between the Internet gateway 140 and the network 102 and/or backend systems 110.

As illustrated in FIG. 1, the Internet gateway 140 may include computer-readable program instructions 148 stored in the memory device 146, which in one embodiment includes the computer-readable instructions 148 that may include one or more Internet gateway applications 147. In some embodiments, the memory device 146 includes a datastore 149 for storing data related to the Internet gateway 140, including but not limited to data created and/or used by the Internet gateway applications 147.

Figure 2:
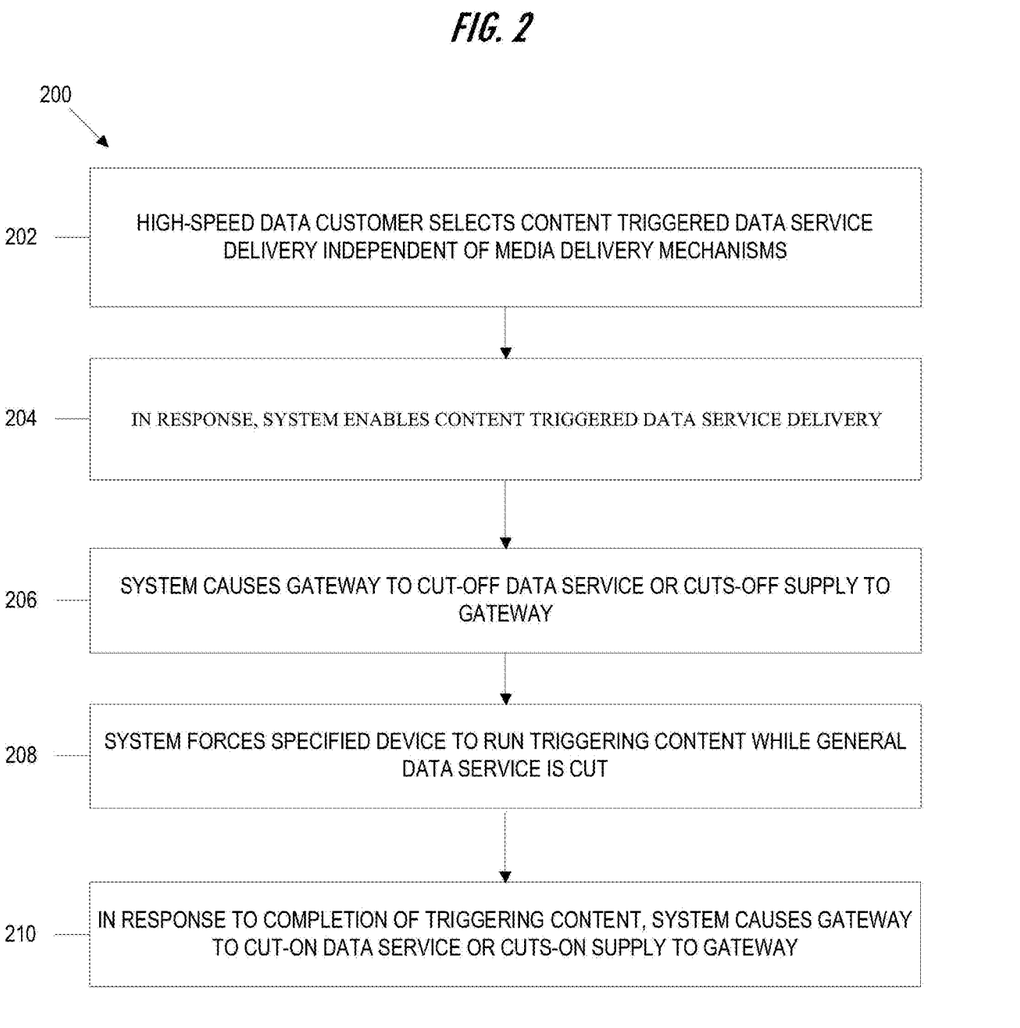
FIG. 2 is a flowchart illustrating a method for content triggered high-speed data service delivery according to embodiments of the present invention.

Referring now to FIG. 2, a flowchart illustrates a method for content triggered high-speed data service delivery independent of media delivery mechanisms. The first step, as represented by block 202, is that a high-speed data customer selects content triggered data service delivery. Such delivery is independent of media delivery mechanisms. The next step, as represented by block 204, is that the system enables content triggered data service delivery in response to the customer selection. Next, as represented by block 206, in some embodiments, the system causes the gateway to cut-off data service. In other embodiments, the system cuts-off the supply to the gateway. The next step, as represented by block 208, is for the system to force a specified device to run triggering content while general data service is cut. Finally, as represented by block 210, in response to completion of triggering content, the system causes the gateway to cut-on data service in some embodiments. In other embodiments, in response to completion of triggering content playback, the system cuts-on the supply to the gateway.

Figure 3A:
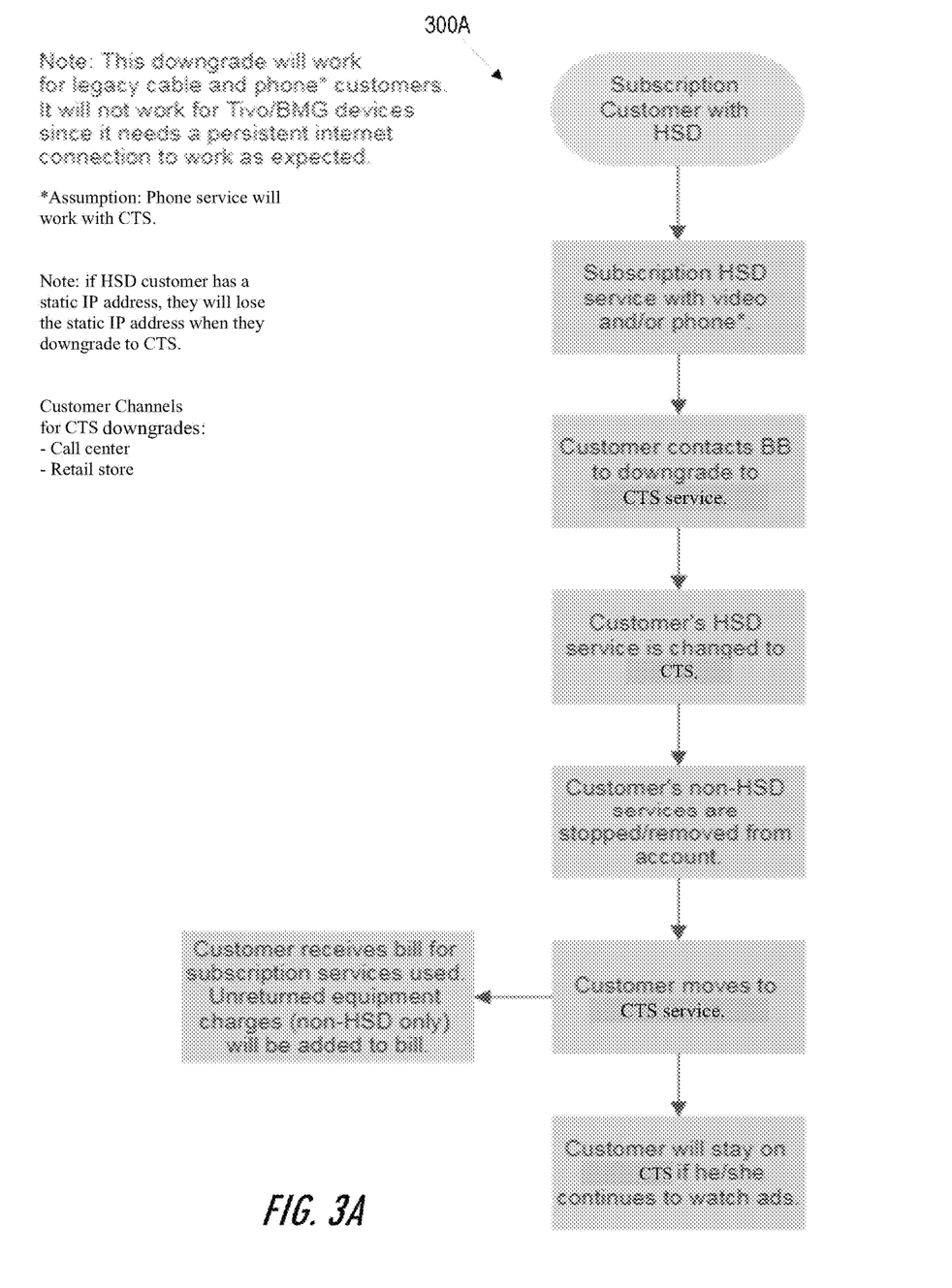

Referring now to FIG. 3A, a flowchart illustrates a method 300A for transitioning a customer from high speed data (HSD) service to content triggered service. The process begins with a customer having a subscription-based HSD account coupled with video (television) and/or phone. The customer contacts the Internet service provider (ISP) to change from a subscription-based account to a content triggered account. In response, the ISP changes the customer's subscription-based account to a content triggered account. The customer's non-HSD services are stopped and/or removed from the customer's account. Provided the customer views the triggered content, the content triggered service will continue. The billing system may initiate an invoice for final subscription service charges and any unreturned equipment charges.

Figure 3B:
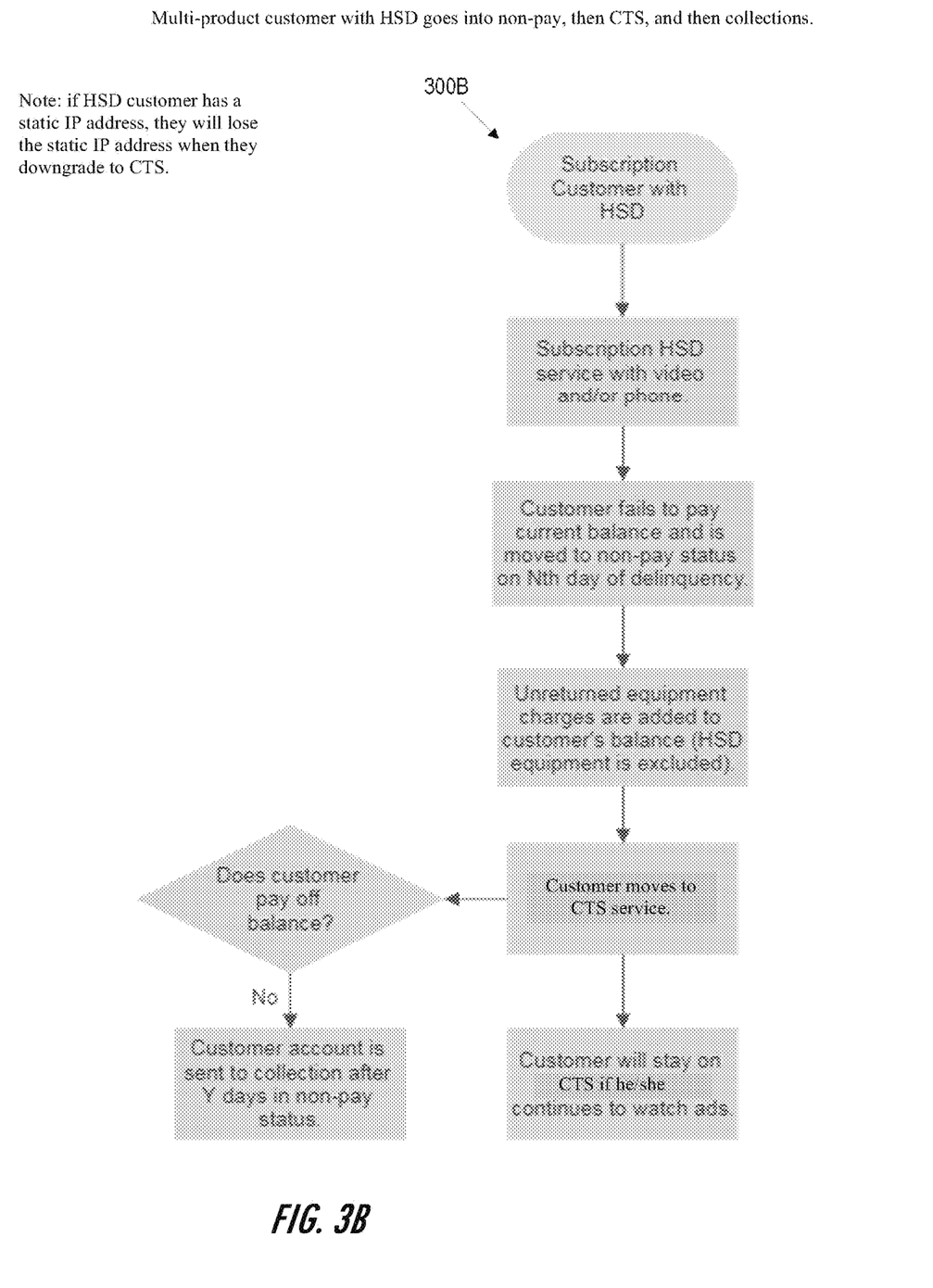

Referring now to FIG. 3B, a flowchart illustrates a method 300B for transitioning delinquent customer account from subscription-based HSD coupled with video and/or phone to a non-paying status, to content triggered service, and finally to collections. When the customer is placed in non-payment status, the customer may be required to pay off the outstanding balance regardless of transition to content triggered service. In other embodiments, the customer may be allowed to pay off an outstanding balance by viewing additional content over and above the content necessary to maintain content triggered service.

Figure 3C:
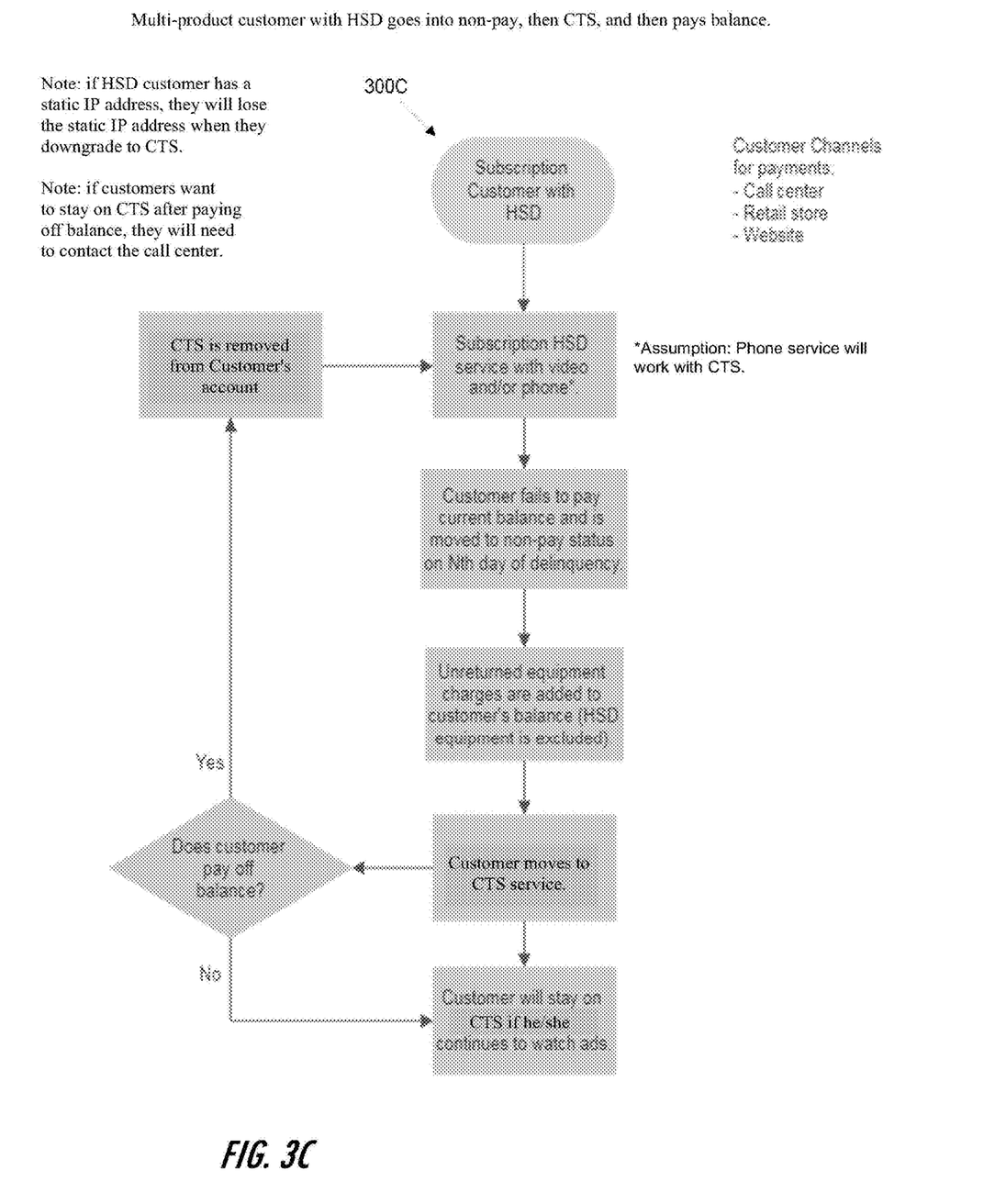

Referring now to FIG. 3C, a flowchart illustrates a method 300C for transition of a customer account from HSD coupled with video and/or phone to content triggered service and back to subscription-based HSD upon balance payoff. In such a situation, in some implementations, the customer is allowed to remain on the content triggered service provided the customer continues to view content. That is, the customer may not be required to pay-off the balance or be sent to collections provided the customer continues to view content related to the content triggered service.

Figure 3D:
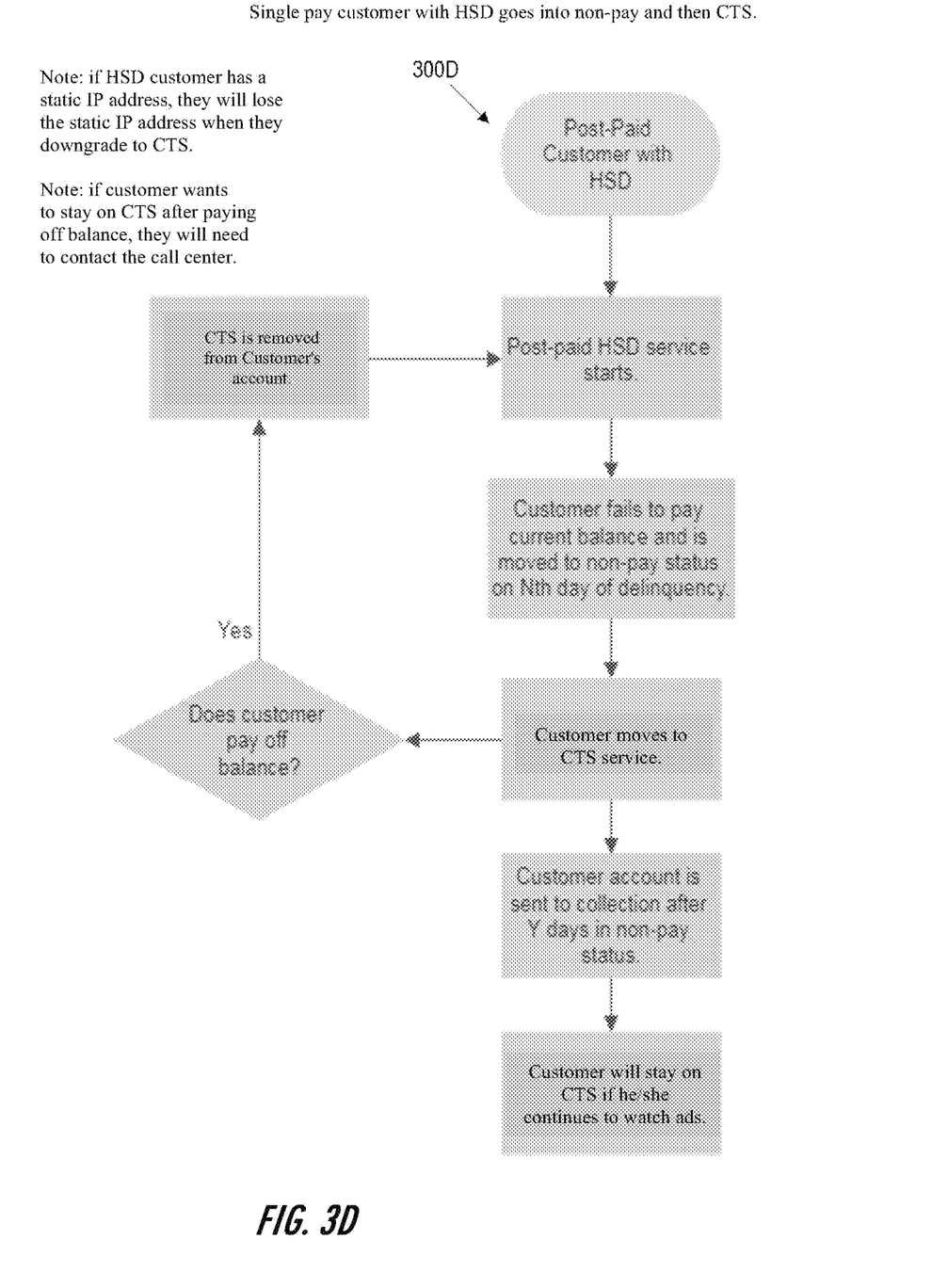

Referring now to FIG. 3D, a flowchart illustrates a method 300D for transitioning a post-paid customer from subscription-based HSD service to content triggered service and back again when the customer pays the outstanding balance. If the customer fails to pay-off balance for a period of time, the account may be sent to collections; however, the customer can maintain the content triggered service provided the customer continues to view content for the service.

Figure 3E:
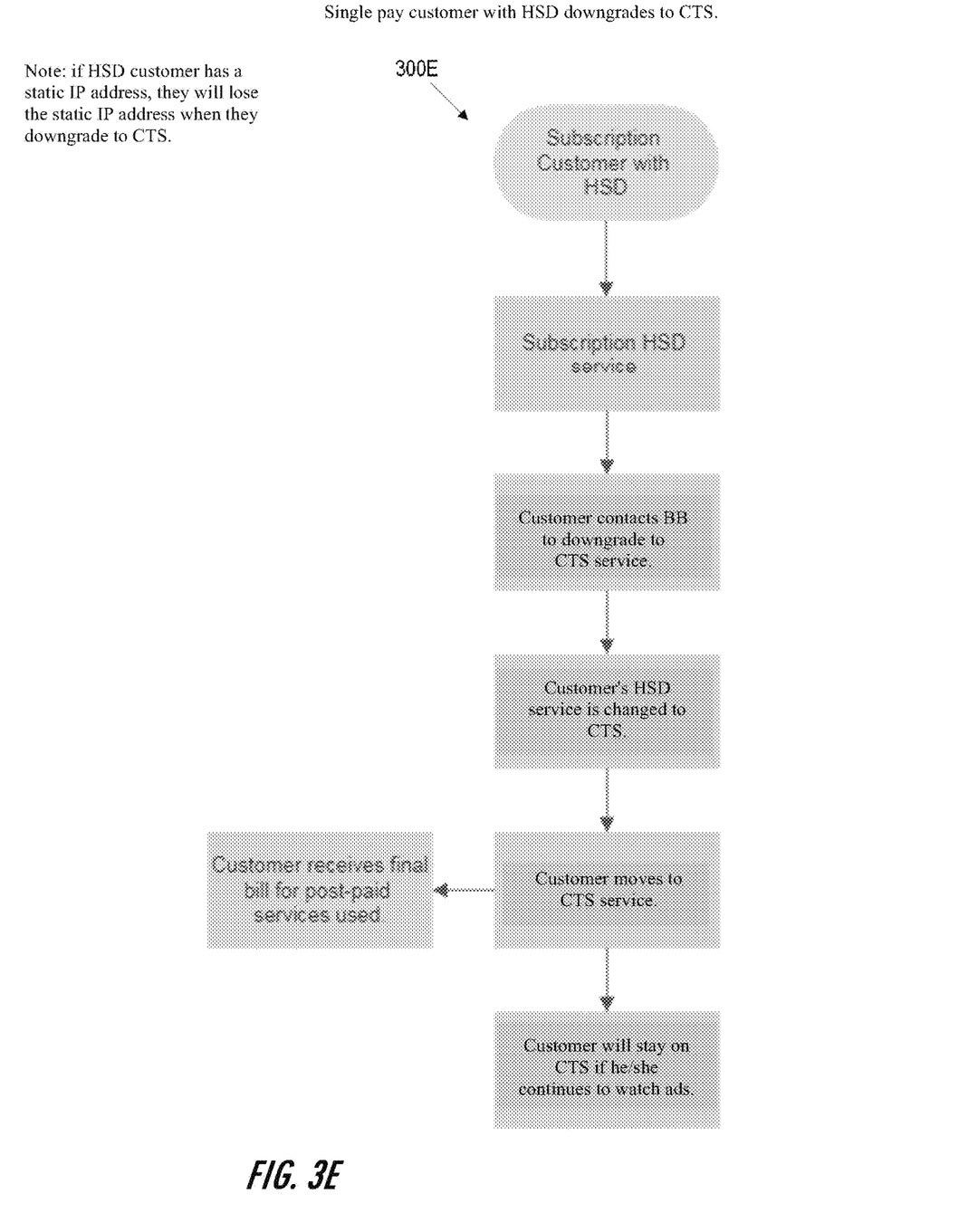

Referring now to FIG. 3E, a flowchart illustrates a method 300E for transitioning a subscription-based HSD account to content triggered service.

Figure 3F:
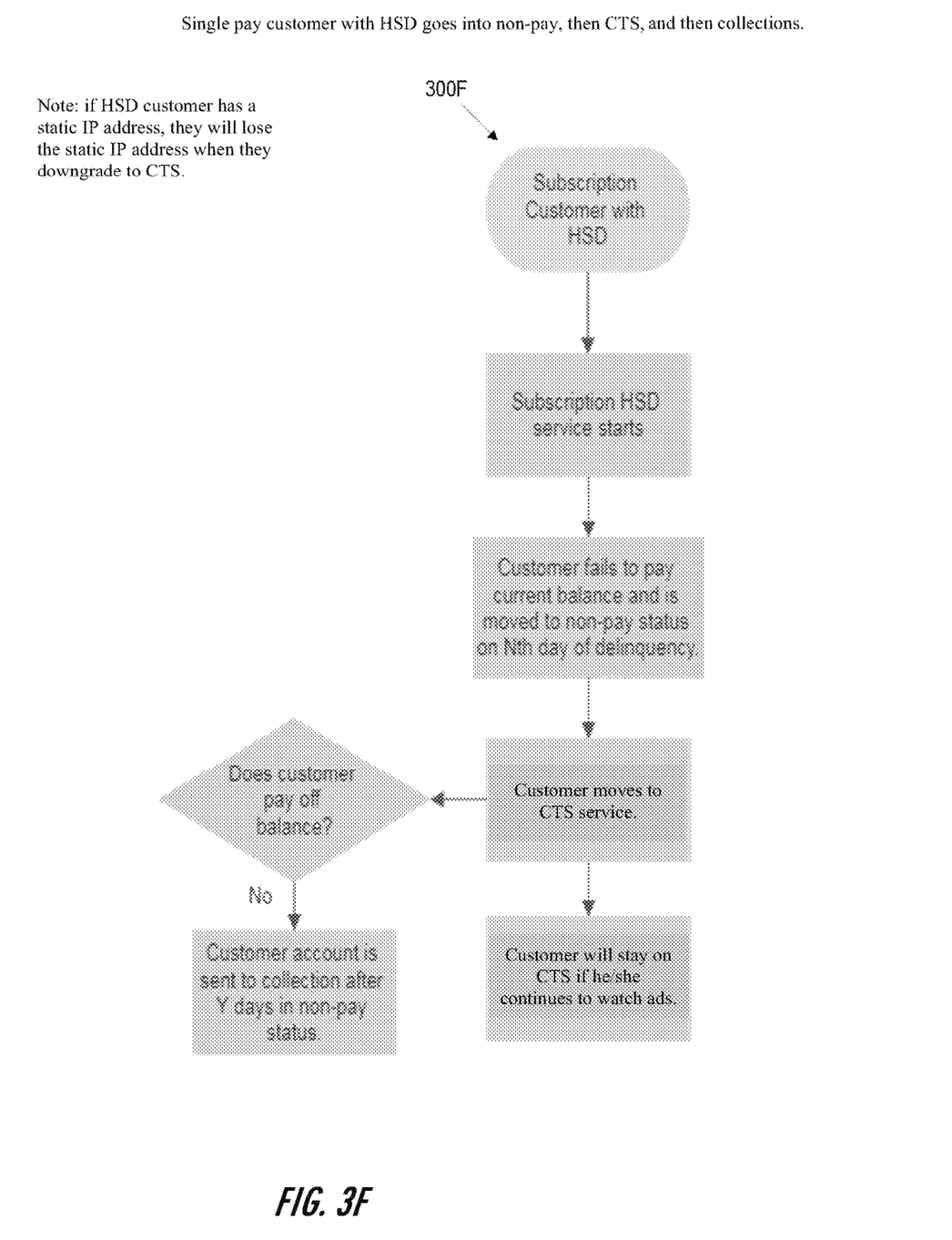

Referring now to FIG. 3F, a flowchart illustrates a method 300F for transitioning a subscription-based HSD account to non-pay status to content triggered service.

Figure 3G:
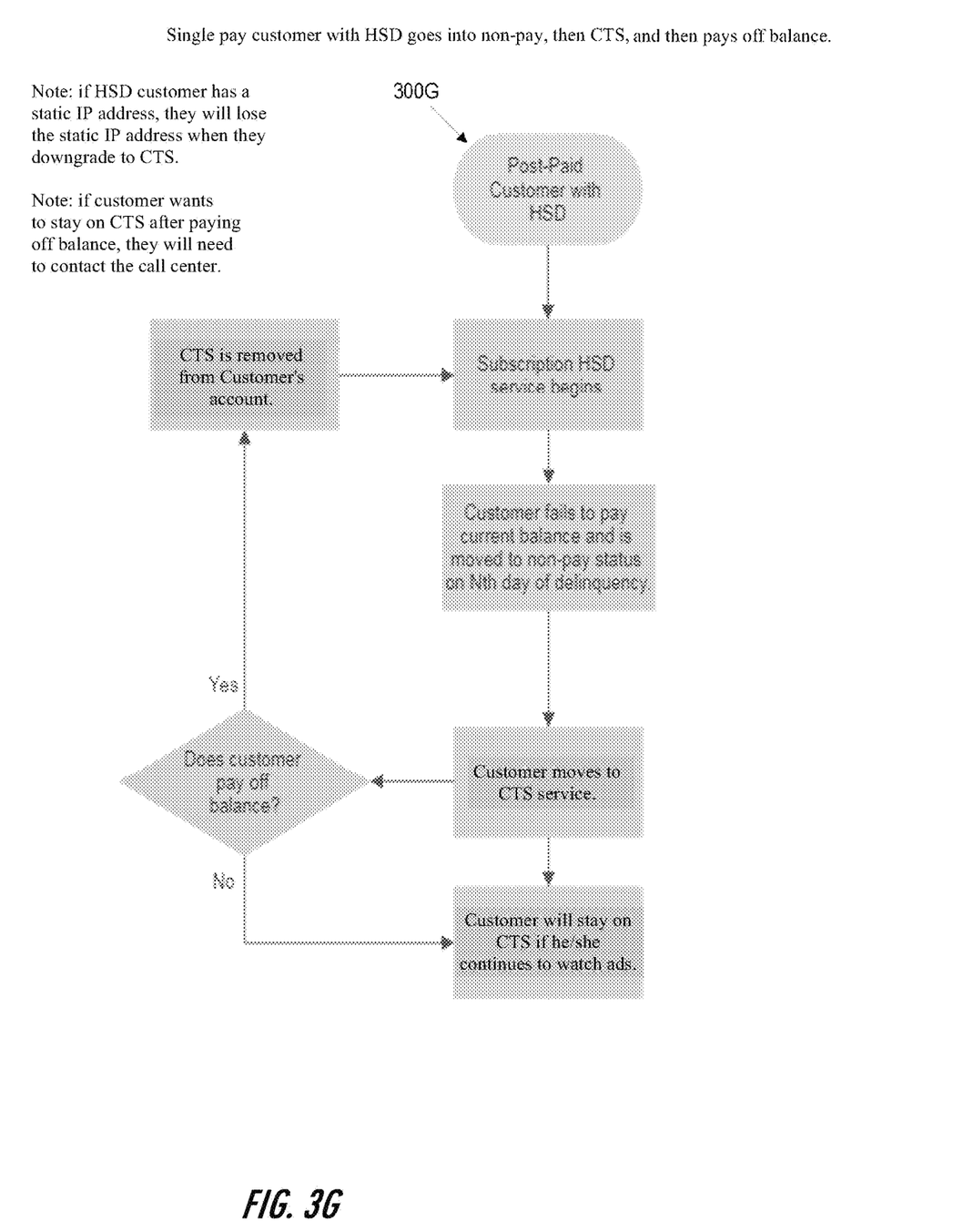

Referring now to FIG. 3G, a flowchart illustrates a method 300G for transitioning a post-paid HSD account to non-pay status to content triggered service and back to post-paid HSD provided the balance is paid.

Figure 3H:
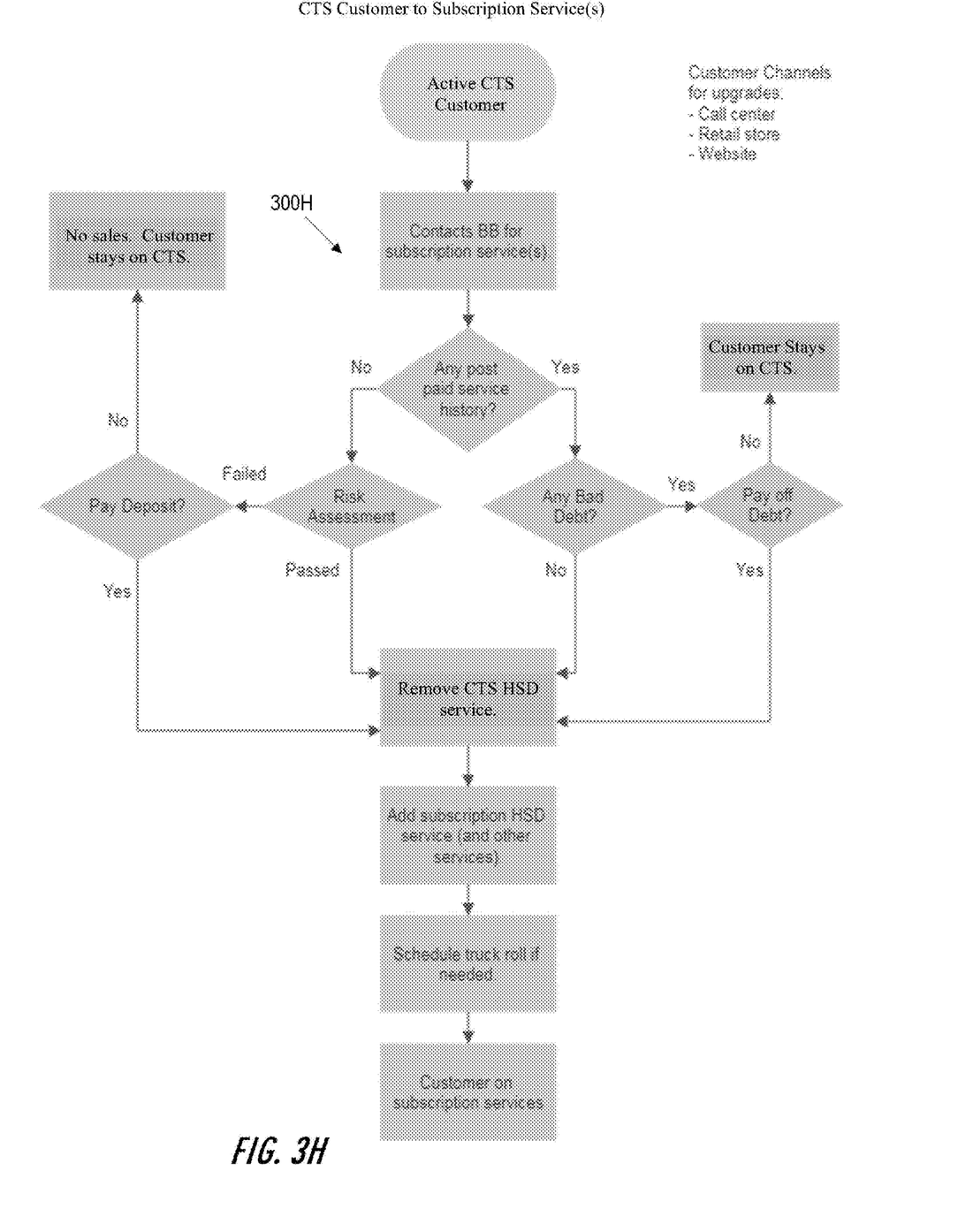

Referring now to FIG. 3H, a flowchart illustrates a method 300H for transitioning a customer from content triggered service to subscription-based service. Depending on the customer's history of post-paid service, bad debt, risk assessment, and payment of deposit, the customer may be able to move from content triggered service to subscription-based service.

Referring now to FIG. 3I, a flowchart illustrates a method 300I for onboarding a new customer to content triggered service, which will generally remain available to the customer provided the customer views the triggering content for the service.

Figure 3J:
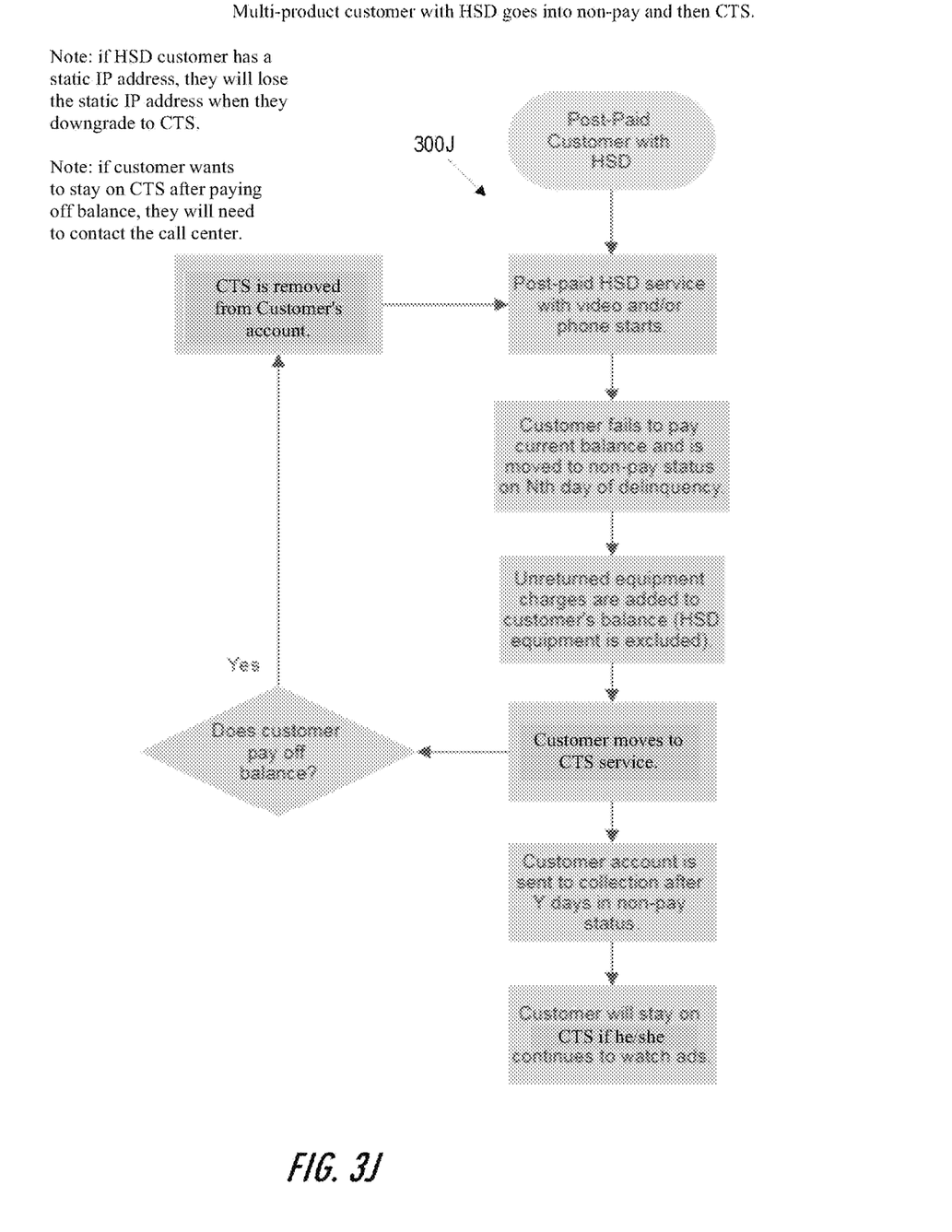

Referring now to FIG. 3J, a flowchart illustrates a method 300J for transitioning a post-paid HSD account to non-pay status, to content triggered service, and depending on payment of outstanding balance, back to post-paid service or to collections and continued access through the content triggered service.

It is understood that the systems and devices described herein illustrate one embodiment of the invention. It is further understood that one or more of the systems, devices, or the like can be combined or separated in other embodiments and still function in the same or similar way as the embodiments described herein.

Any suitable computer-usable or computer-readable medium may be utilized. The computer usable or computer readable medium may be, for example but not limited to, an electronic, magnetic, optical, electromagnetic, infrared, or semiconductor system, apparatus, or device. More specific examples (a non-exhaustive list) of the computer-readable medium would include the following: an electrical connection having one or more wires; a tangible medium such as a portable computer diskette, a hard disk, a random access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as Java, Perl, Smalltalk, C++ or the like. However, the computer program code/computer-readable instructions for carrying out operations of the invention may also be written in conventional procedural programming languages, such as the "C" programming language or similar programming languages.

Embodiments of the present invention described above, with reference to flowchart illustrations and/or block diagrams of methods or apparatuses (the term "apparatus" including systems and computer program products), will be understood to include that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A backend system for content triggered high-speed data (HSD) service delivery independent of media delivery mechanisms, the system comprising:
   a memory device; and
   a processing device operatively coupled to the memory device, wherein the processing device is configured to execute computer-readable program code to:
   (a) receive from a high-speed data customer instructions indicating a selection of content triggered data service delivery;
   (b) in response to receiving the instructions, enable content triggered data service delivery;
   (c) cause a gateway to cut-off HSD service for a duration in which the content triggered data service delivery is enabled;
   (d) cause a specified device connected to the gateway on its customer side to run a triggering content; and
   (e) based on and in response to completion of running of the triggering content on the specified device, (i) causing the gateway to cut-on HSD service for the customer, and (ii) removing the content triggered data service delivery.

2. The backend system of claim 1, wherein the received instructions are transmitted from a device on a customer side of the gateway, through the gateway, to the backend system.

3. The backend system of claim 2, wherein the specified device is the device from which the received instructions were transmitted.

4. The backend system of claim 1, wherein the specified device is predetermined based on at least selected from a most-used device, a least-used device, a latest-used device, and a next-used device.

5. The backend system of claim 1, wherein cutting off HSD service by the gateway comprises preventing HSD service for all devices connected to a customer side of the gateway.

6. The backend system of claim 1, wherein cutting off HSD service by the gateway comprises preventing HSD service for less than all devices connected to a customer side of the gateway.

7. The backend system of claim 1, wherein each of (c), (d), and (e) comprises transmitting instructions from the backend system.

8. A backend system for content triggered high-speed data (HSD) service delivery
   independent of media delivery mechanisms, the system comprising:
   a memory device; and
   a processing device operatively coupled to the memory device, wherein the processing device is configured to execute computer-readable program code to:
   receive instructions from high-speed data customer indicating a selection of content triggered data service delivery;
   in response to receiving the instructions, enable content triggered data service delivery;
   cut-off supply to a gateway for a duration in which the content triggered data service delivery is enabled;
   cause a specified device connected to the gateway on its customer side to run a triggering content; and
   based on and in response to completion of running of the triggering content on the specified device, (i) cutting on supply to the gateway, and (ii) removing the content triggered data service delivery.

9. The backend system of claim 8, wherein the received instructions are transmitted from a device on a customer side of the gateway, through the gateway, to the backend system.

10. The backend system of claim 9, wherein the specified device is the device from which the received instructions were transmitted.

11. The backend system of claim 8, wherein the specified device is predetermined based on at least selected from a most-used device, a least-used device, a latest-used device, and a next-used device.

12. The backend system of claim 8, wherein cutting off HSD service by the gateway comprises preventing HSD service for all devices connected to a customer side of the gateway.

13. The backend system of claim 8, wherein cutting off HSD service by the gateway comprises preventing HSD service for less than all devices connected to a customer side of the gateway.

14. The backend system of claim 8, wherein each of (c), (d), and (e) comprises transmitting instructions from the backend system.

15. A system for content triggered HSD service delivery independent of media delivery mechanisms, the system comprising:
 a backend system comprising:
 a memory device; and
 a processing device operatively coupled to the memory device, wherein the processing device is configured to execute computer-readable program code to:
  receive instructions from high-speed data customer indicating a selection of content triggered data service delivery;
  in response to receiving the instructions, enable content triggered data service delivery;
  cause a gateway system to cut-off HSD service for a duration in which the content triggered data service delivery is enabled;
  cause a specified device connected to a gateway on its customer side, through the gateway system, to run a triggering content; and
  based on and in response to completion of running of the triggering content on the specified device, (i) causing the gateway to cut-on HSD service for the customer, and (ii) removing the content triggered data service delivery; and
 wherein the gateway system is in operative communication with the backend system, the gateway system comprising:
  the gateway;
  at least one memory device; and
  at least one processing device operatively coupled to the at least one memory device, wherein the at least one processing device is configured to execute program instructions to:
   in response to receiving the instructions from the backend system, cut-off HSD service and cut-on HSD service.

16. The backend system of claim 15, wherein the specified device is the device from which the received instructions were transmitted.

17. The backend system of claim 15, wherein the specified device is predetermined based on at least selected from a most-used device, a least-used device, a latest-used device, and a next-used device.

18. The backend system of claim 15, wherein cutting off HSD service by the gateway comprises preventing HSD service for all devices connected to a customer side of the gateway.

19. The backend system of claim 15, wherein cutting off HSD service by the gateway comprises preventing HSD service for less than all devices connected to a customer side of the gateway.

20. A method for content triggered HSD service delivery independent of media delivery mechanisms, the method comprising:
 (a) receiving instructions from a high-speed data customer indicating a selection of content triggered data service delivery;
 (b) in response to receiving the instructions, enabling content triggered data service delivery;
 (c) causing a gateway to cut-off HSD service for a duration in which the content triggered data service delivery is enabled;
 (d) causing a specified device connected to the gateway on its customer side to run a triggering content; and
 (e) based on and in response to completion of running of the triggering content on the specified device, (i) causing the gateway to cut-on HSD service for the customer, and (ii) removing the content triggered data service delivery.

21. A method for content triggered HSD service delivery independent of media delivery mechanisms, the method comprising:
 (a) receiving instructions from high-speed data customer indicating a selection of content triggered data service delivery;
 (b) in response to receiving the instructions, enabling content triggered data service delivery;
 (c) cutting off supply to a gateway for a duration in which the content triggered data service delivery is enabled;
 (d) causing a specified device connected to the gateway on its customer side to run a triggering content; and
 (e) based on and in response to completion of running of the triggering content on the specified device, (i) cutting on supply to the gateway, and (ii) removing the content triggered data service delivery.

* * * * *